US012716194B2

(12) United States Patent
Azzolin et al.

(10) Patent No.: US 12,716,194 B2
(45) Date of Patent: Aug. 25, 2026

(54) CRUSHER BUCKET

(71) Applicant: MECCANICA BREGANZESE S.P.A. IN FORMA ABBREVIATA MB S.P.A., Fara Vicentino (IT)

(72) Inventors: Diego Azzolin, Fara Vicentino (IT); Guido Azzolin, Breganze (IT)

(73) Assignee: MECCANICA BREGANZESE S.P.A. IN FORMA ABBREVIATA MB S.P.A. (IT)

(*) Notice: Subject to any disclaimer, the term of this patent is extended or adjusted under 35 U.S.C. 154(b) by 272 days.

(21) Appl. No.: 18/710,709

(22) PCT Filed: Sep. 29, 2022

(86) PCT No.: PCT/IB2022/059278
§ 371 (c)(1),
(2) Date: May 16, 2024

(87) PCT Pub. No.: WO2023/089389
PCT Pub. Date: May 25, 2023

(65) Prior Publication Data
US 2025/0012044 A1 Jan. 9, 2025

(30) Foreign Application Priority Data
Nov. 17, 2021 (IT) ........................ 102021000029111

(51) Int. Cl.
*E02F 3/96* (2006.01)
*B02C 1/04* (2006.01)
*E02F 3/407* (2006.01)

(52) U.S. Cl.
CPC ................ *E02F 3/965* (2013.01); *B02C 1/04* (2013.01); *E02F 3/407* (2013.01)

(58) Field of Classification Search
CPC .. B02C 1/02; B02C 1/04; B02C 1/043; B02C 1/06; B02C 1/10; B02C 1/025; E02F 3/407; E02F 3/965
See application file for complete search history.

(56) References Cited

U.S. PATENT DOCUMENTS

2012/0018558 A1* 1/2012 Gervais .................. E02F 3/407 241/269

FOREIGN PATENT DOCUMENTS

EP 1532321 5/2005
WO WO-2004020747 A1 * 3/2004 ............. E02F 3/405
(Continued)

OTHER PUBLICATIONS

Search Report & Written Opinion issued in PCT/IB2022/059278 (Feb. 6, 2023).

*Primary Examiner* — Bobby Yeonjin Kim
(74) *Attorney, Agent, or Firm* — Barnes & Thornburg; Steven D. Shipe

(57) ABSTRACT

A crusher bucket comprises a frame, crushing elements comprising a movable jaw and a fixed jaw which are received in the frame, and an adjustment device which can change a distance between the jaws at an outlet of the material. The adjustment device comprises a strut having a first end and a second end which are opposite each other and which are received in a first seat which is defined in the frame and in a second seat which is defined in the movable jaw, respectively, and one or more spacers which are or can be removably inserted between the first seat and the first end of the strut through a first opening which is constructed in a side wall of the frame.

10 Claims, 8 Drawing Sheets

(56) References Cited

FOREIGN PATENT DOCUMENTS

| | | | | |
|---|---|---|---|---|
| WO | 2011/042923 | | 4/2011 | |
| WO | WO-2011042923 | A1 * | 4/2011 | ............. B02C 1/025 |

* cited by examiner

CRUSHER BUCKET

CROSS REFERENCE TO RELATED APPLICATIONS

This application is a U.S. nationalization under 35 U.S.C. § 371 of International Application No. PCT/IB2022/059278, filed 29 Sep. 2022, which claims priority to Italian Patent Application No. 102021000029111, filed 17 Nov. 2021. The disclosures set forth in the referenced applications are incorporated herein by reference in their entireties.

TECHNICAL FIELD

The present invention relates to an improved crusher bucket, particularly for crushing inert material, processing waste and demolition material, which is generally referred to below as gravel, according to the preamble of the main claim.

TECHNOLOGICAL BACKGROUND

Within the technical field being referred to, there are known buckets comprising an external frame which is configured to collect gravel and inside which there are mounted crusher elements for the collected material.

It may be noted that, in this context, the term "bucket" is intended to be understood to generally indicate any member which is provided and intended to be engaged at the free end of an arm of an operating machine.

An example of a crusher bucket according to the prior art is described in the patent EP1532321 in the name of the same Applicant.

In this example, the crusher elements which are provided in the frame comprise a pair of jaws which face each other, one being movable relative to the other in order to compress and crush the material present between the jaws.

In particular, the bucket comprises a first jaw which is positioned on the base of the bucket and which is fixed with respect to the frame during the crushing operations and a second movable jaw which is fixed to a rotatable eccentric shaft. In this manner, the movable jaw carries out oscillating movements with respect to the fixed jaw bringing about the crushing of the material interposed between the two jaws.

In this known bucket, there is provision for adjusting the overall distance between the fixed jaw and the movable jaw by inserting suitable spacers between the movable jaw and the frame. By increasing or decreasing the number of spacers which are interposed between the movable jaw and the frame, it is possible to adjust the extent of the discharge section of the gravel and therefore also the size of the crushed gravel.

The crusher bucket described in the patent cited above has definitely constituted substantial progress in comparison with the buckets known previously. However, a number of disadvantages which limit the performance levels thereof have been encountered.

In fact, in order to be able to adjust the extent of the discharge section of the gravel, it is necessary to bring along, typically in a construction site, a pack of spacers, which are quite heavy and bulky and therefore difficult to transport. Therefore, the possibilities for adjustment are in fact limited on the basis of the number of spacers available.

Furthermore, when the spacers are not being used, it is necessary to provide for down times in order to locate them, with obvious repercussions on the productivity of the bucket, and there is further the real risk that the spacers may become scattered. This may involve significant technical problems because, for lack of suitable spacers, it is impossible to carry out the adjustment.

DESCRIPTION OF THE INVENTION

The problem addressed by the present invention is to provide a crusher bucket which is structurally and functionally configured to at least partially overcome one or more of the disadvantages set out with reference to the cited prior art.

In the context of this problem, an object of the present invention is to provide a crusher bucket in which the dimensions of the crushed material are adjustable in a practical and efficient manner.

Another object is to provide a crusher bucket which is capable of withstanding the loads brought about by the resistance of the material to be crushed.

This problem is solved and these objects are achieved by the invention by means of a crusher bucket which comprises a frame in which crusher elements comprising a movable jaw and a fixed jaw are received.

Advantageously, the bucket further comprises an adjustment device which can change a distance between the movable jaw and the fixed jaw at an outlet of the material.

In a preferred embodiment, the adjustment device comprises a strut which is interposed between the frame and the movable jaw. More particularly, the strut has a first end and a second end which are opposite each other and which are received in a first seat which is defined in the frame and in a second seat which is defined in the movable jaw, respectively. Preferably, the first seat and the second seat are defined in portions of the frame and the movable jaw which are adjacent to the outlet of the material, respectively.

It is further preferable for the adjustment device to comprise one or more spacers which are or can be removably inserted between the first seat and the first end of the strut. This insertion can be carried out through a first opening, preferably a through-opening, which is constructed, for example, in a side wall of the frame.

Advantageously, the frame further comprises a third seat which is configured to receive the spacers at rest.

According to another advantageous feature, the spacers at rest are or are able to be removably inserted in the third seat through a second opening, preferably a through-opening, which is constructed, for example, on a side wall of the frame and particularly on the same side wall at which the first opening is constructed.

In this manner, the third seat allows a stock of spacers at rest which are always available and readily accessible to be stored directly in the bucket.

BRIEF DESCRIPTION OF THE DRAWINGS

The features and advantages of the invention will be better appreciated from the detailed description of preferred embodiments which are illustrated by way of non-limiting example with reference to the appended drawings, in which.

PREFERRED EMBODIMENTS OF THE INVENTION

Figure 1:
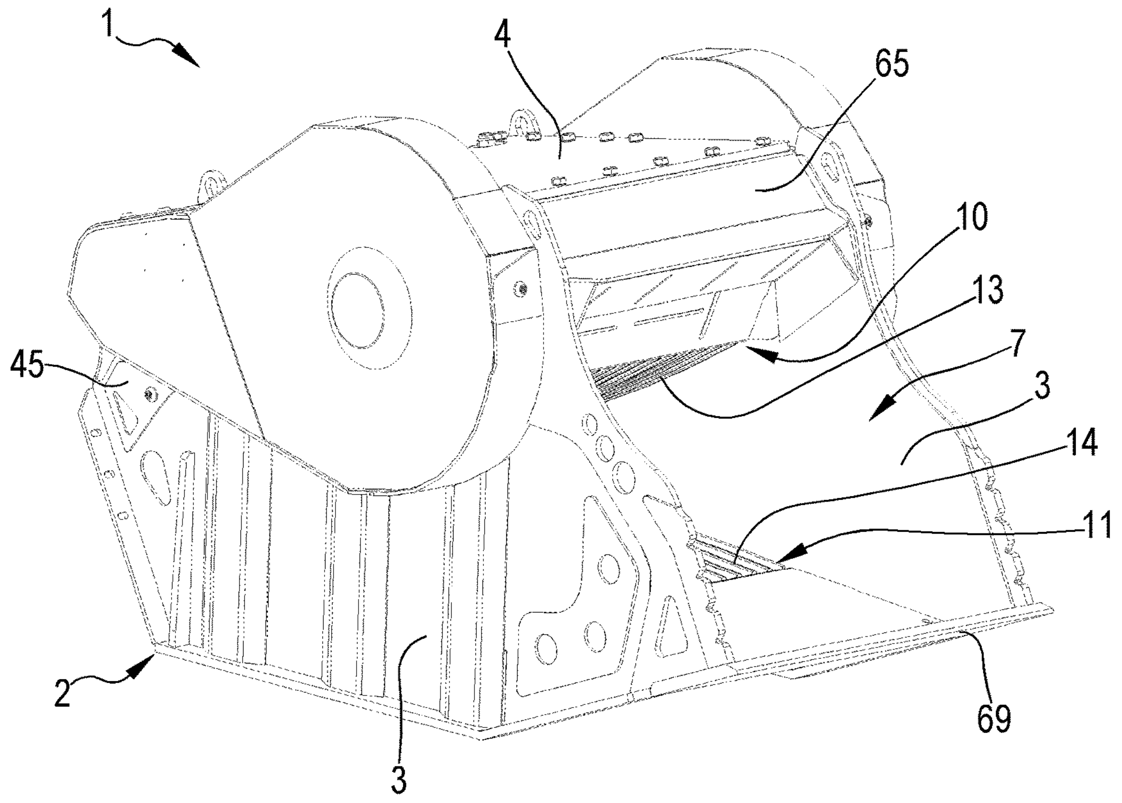
FIG. 1 is a perspective front view of a crusher bucket according to the present invention.
Figure 2:
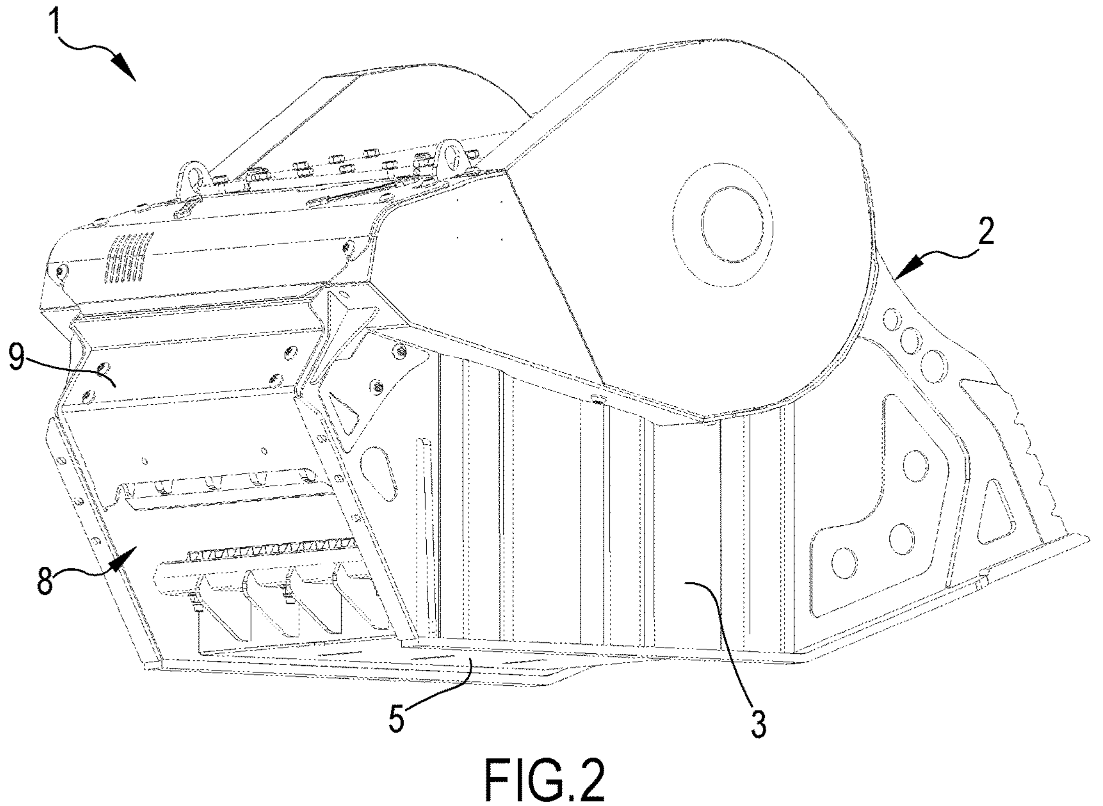
FIG. 2 is a perspective rear view of the bucket of FIG. 1.

Initially with reference to FIGS. 1 and 2, a crusher bucket according to the present invention is generally designated 1.

The bucket 1 comprises an external frame 2 which preferably comprises two opposite side walls 3.

In a preferable manner, there are further provided an upper wall 4 and a lower wall 5 of the frame which are also opposite each other and which extend between the side walls 3, particularly from one of the side walls to the other.

It will be appreciated that the upper arrangement and lower arrangement are defined in relation to the position of the bucket during the collection step of the material from the ground.

Figure 3:
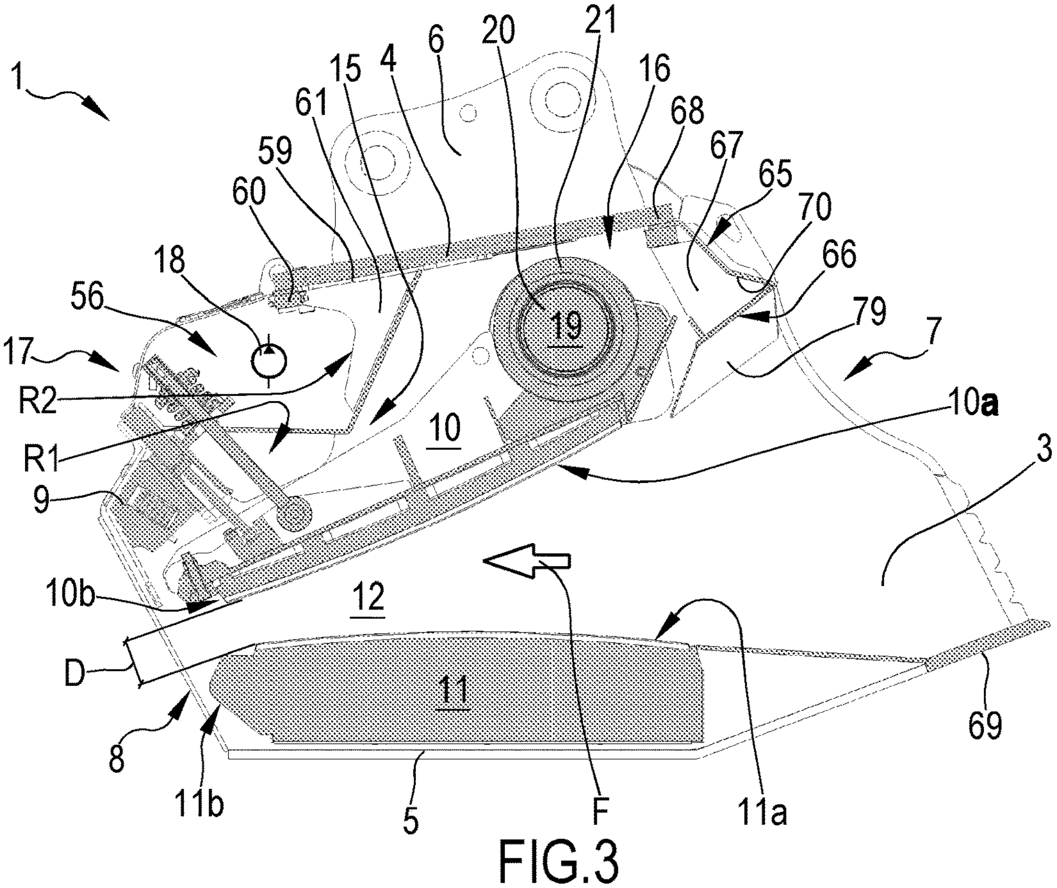
FIG. 3 is a lateral section of the bucket of FIG. 1, in which attachments for engaging the bucket at the free end of an arm of an operating machine, which are not illustrated in FIGS. 1 and 2, are illustrated.

With reference to the example of FIG. 3, there are provided on the upper wall 4 of the frame attachments 6 for engaging the bucket at the free end of an arm of an operating machine (not illustrated).

An inlet 7 for charging gravel or other material to be crushed, typically stone, and an opposite outlet 8 for discharging the processed material after the crushing operation are defined in the frame 2.

A flow direction F of the material is defined from the inlet 7 to the outlet 8.

Preferably, the development of the side walls 3, upper wall 4 and/or lower wall 5 of the frame substantially follows the flow direction F.

The frame 2 may further comprise a rear wall 9 which connects the side walls 3 to each other adjacent to the outlet 8.

The side walls 3, upper wall 4, lower wall 5 and/or rear wall 9 of the frame preferably form external walls of the frame.

There are mounted inside the frame 2 crushing elements for the gravel comprising a movable jaw 10 and an opposite fixed jaw 11 which is fixedly joined to the frame.

The movable jaw 10 can be arranged adjacent to the upper wall 4 of the frame while the fixed jaw 11 can be arranged adjacent to the lower wall 5 of the frame.

Inside the bucket, more particularly between the jaws 10 and 11, there is preferably defined a crushing zone 12, which is laterally delimited by the side walls 3 of the frame.

According to a preferred embodiment, respective grooved plates 13, 14 which are able to facilitate the crushing action are fixed to the jaws 10 and 11.

In each of the jaws 10 and 11, there are defined a respective front portion 10*a*, 11*a* and a respective rear portion 10*b*, 11*b* which are opposite each other. The front portions 10*a*, 11*a* of the jaws are positioned at the inlet 7 while the rear portions 10*b*, 11*b* are positioned at the outlet 8. The distance between the front portions 10*a*, 11*a* of the jaws defines the maximum dimension of the gravel which can be charged in the bucket and is typically greater than the distance D between the rear portions 10*b*, 11*b* which correlates instead with the desired maximum dimension of the gravel at the outlet 8. Advantageously, the distance D between the rear portions 10*b*, 11*b* can be adjusted, as explained in detail below.

The bucket 1 further comprises a movement device 15 which acts on the movable jaw 10 in order to move it away from and towards the fixed jaw 11 in accordance with a suitable trajectory so as to crush the material present between the jaws.

More particularly, the movement device 15 is able to confer on the movable jaw 10 a combined rotational and translational movement in relation to the fixed jaw 11, wherein a first component of the movement is away from and towards the fixed jaw 11 and a second component of the movement is substantially parallel with the flow direction F of the material.

This particular movement can be obtained as a result of a movement device 15 comprising an eccentric connection 16 at the front portion 10*a* of the movable jaw and a second strut type connection 17 at the rear portion 10*b* of the movable jaw, as explained in detail below.

The movement device 15 may further comprise a motor 18 which is received inside the frame 2. In one embodiment, the motor 18, where applicable by means of a transmission (not illustrated), controls a shaft 19 in terms of rotation.

The shaft 19 is preferably eccentric. In one embodiment, the shaft 19 comprises a central portion 20 and two end portions (not illustrated) eccentric with respect to the central portion. The end portions are preferably supported on the side walls 3 of the frame while the movable jaw 10 is preferably supported on the central portion 20. One or more bearings (not illustrated) can be applied on the central portion 20 while a metal tube 21 which is rigidly connected to the front portion 10*a* of the movable jaw can be fixed to the external surface of the bearings.

The above-described system constitutes an eccentric connection 16 between the movable jaw 10 and the shaft 19. Naturally, other structures which are functionally similar and which produce a similar movement or which have similar effects can be provided.

Figure 4:
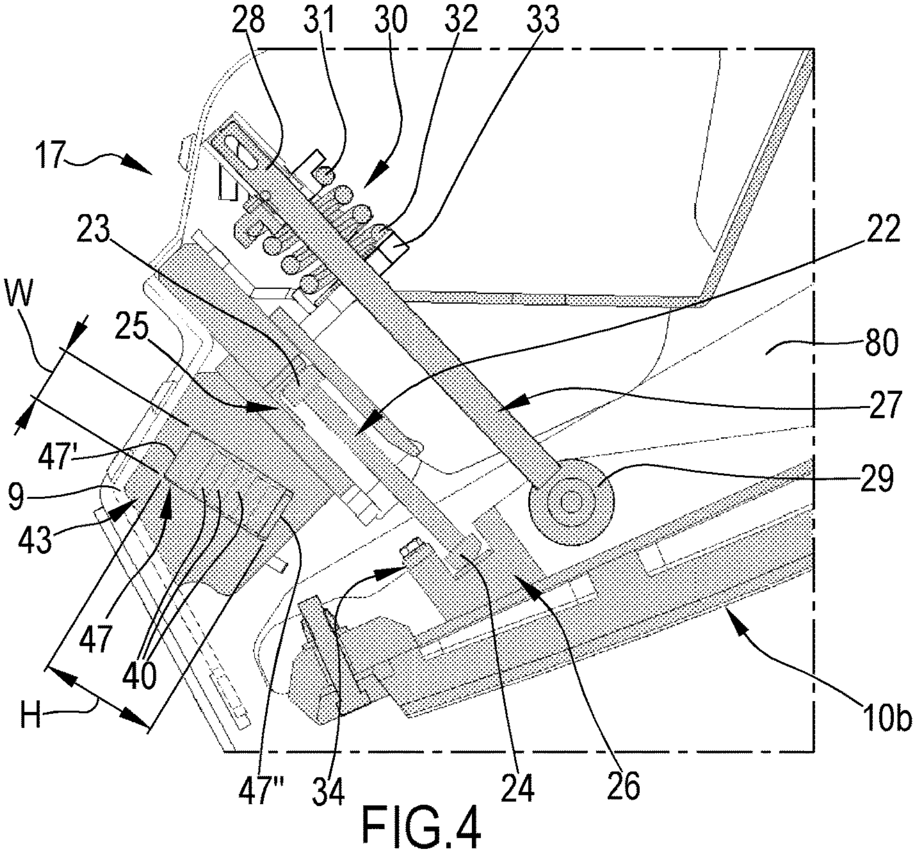
FIG. 4 is an enlarged view of a detail of FIG. 3.

With reference to the example of FIG. 4, the second connection 17 of the movable jaw comprises a strut 22.

In one embodiment, the strut 22 extends longitudinally between a first end 23 and a second end 24 thereof which are opposite each other and which are preferably received in a first seat 25 which is defined in the frame and in a second seat 26 which is defined in the movable jaw, respectively.

Still in a preferable manner, the strut 22 is engaged in terms of articulation at the two opposite ends 23, 24 thereof both with the first seat 25 and with the second seat 26 in such a manner that an oscillation, though of limited extent, of the strut is allowed with respect to the frame and the movable jaw. In a preferred embodiment, the strut 22 is therefore interposed and retained between the first seat and the second seat 25, 26.

The first seat and the second seat 25, 26 are preferably arranged adjacent to the outlet 8 of the material. The second seat 26, in particular, is defined on the rear portion 10*b* of the movable jaw.

In some embodiments, the second connection 17 of the movable jaw further comprises a rod 27, a first end 28 of which is connected to the frame and a second opposite end 29 of which is connected to the movable jaw so as to maintain the strut 22 held between the first seat 25 and the second seat 26 during the movement of the movable jaw.

To this end, there can also be provided between the movable jaw 10 and the frame 2 resilient means which are able to urge the movable jaw against the strut 22. In the present embodiment, the resilient means comprise a spring 30 which is configured to work preferably with compression.

The first end 28 of the rod can be connected to the frame 2 by means of the spring 30, a first end 31 of which is connected to the first end 28 of the rod and a second opposite end 32 of which is connected to a cross-member 33 which is fixedly joined to the frame.

In order to ensure that the spring 30 is loaded homogeneously, it is preferable for the rod 27 and strut 22 to be substantially parallel with each other.

In one embodiment, the ends 23, 24 of the strut which are received in the first and second seats 25, 26 are rounded in order to facilitate the oscillation thereof about the respective contact lines. More particularly, the ends 23, 24 of the strut have a substantially square profile with rounded edges while the first and second seats 25, 26 preferably have a square profile with greater dimensions with respect to the dimensions of the ends of the strut so that the play present between the elements of the articulation is sufficient to allow the oscillation required. It is thereby possible to avoid lubrication operations of the articulations because there is no friction between the contact surfaces, but rather a rolling action of the ends of the strut on the base of the respective seats.

Naturally, there is also provision for the possibility that the ends 23, 24 of the strut have a hemispherical formation.

Figure 5:
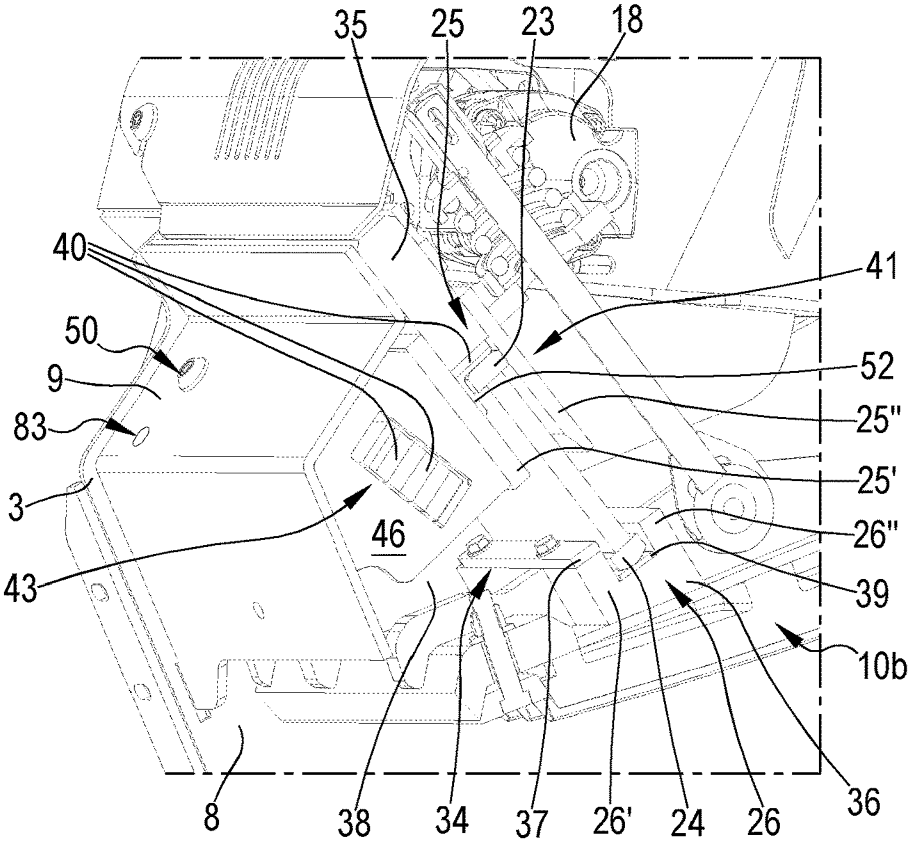
FIGS. 5 to 7 are perspective views of the detail of FIG. 4, in which some components have been removed in order to illustrate other components thereof which are normally not able to be seen.

With reference to the embodiment of FIG. 5, each of the two seats 25 and 26 of the strut is in the form of a groove, for example, with a U-shaped cross-section or a square cross-section which is defined laterally by a respective pair of opposite containment flanks 25', 25" and 26', 26" and, on the base, by respective cross-members 35 and 36.

In particular, the first seat 25 has a first containment flank 25' at the side directed towards the outlet 8 and a second containment flank 25" at the side opposite the outlet.

The second seat 26 also preferably has a respective first containment flank 26' at the side directed towards the outlet 8 and a respective second containment flank 26" at the side opposite the outlet.

In other words, with reference both to the first seat 25 and to the second seat 26, the first containment flanks 25', 26' are arranged downstream of the respective second containment flanks 25", 26" with respect to the flow direction F of the material.

The containment flanks 25', 25", 26', 26" are therefore advantageously configured to contain any movements of the respective ends 23, 24 of the strut towards the inlet 7 or outlet 8 during the movement of the movable jaw.

In a preferred embodiment, the containment flanks 25', 25", 26', 26" and/or the base cross-members 35, 36 of the seats of the strut extend between the side walls 3 of the frame and are located in planes which are substantially perpendicular to the side walls 3.

In some embodiments, the containment flanks 26', 26" of the second seat 26 form with the respective cross-member 36 a structurally monolithic single piece. Preferably, the containment flanks 26', 26" together with the cross-member 36 form a structure which has a cross-section which is substantially C-shaped with the seat 26 being defined between the arms of the C. In this manner, the second seat 26 is more resistant to the loads which are transmitted by the strut 22 during the crushing operations.

In some embodiments, the bucket 1 comprises a stop device 34 which is able to retain the second end 24 of the strut inside the second seat 26 during the movement of the movable jaw.

It is preferable for the stop device 34 to be fixed or able to be fixed removably onto the first containment flank 26' of the second seat.

In this manner, the removal of the stop device 34 allows the insertion/removal of the strut 22 through the outlet 8 during the assembly or the maintenance of the bucket.

It is further preferable for the stop device 34 to be configured in order to extend the first containment flank 26' of the second seat away from the base of the second seat 26 so as to prevent the strut 22 from accidentally leaving the second seat during the movement of the movable jaw.

Preferably, the stop device 34 does not project inside the second seat 26 in order not to interfere with the oscillation of the strut 22.

In one embodiment, the stop device 34 comprises a batten 37 which has a, for example, rectangular cross-section and which has such dimensions as to withstand the forces transmitted through the strut.

The batten 37 can extend between opposite longitudinal members 38 of the movable jaw and be fixed to the first containment flank 26' of the second seat, preferably by means of a bolted connection.

In some embodiments, another batten 39 made from wear-resistant material, more particularly from high-strength steel, is interposed between the second end 24 of the strut and the base of the second seat 26 in order to protect the base of the second seat.

In preferred embodiments, there is provision for the possibility of adjusting the distance D between the rear portions 10*b*, 11*b* of the jaws in order to change the final size of the processed material by interposing one or more spacers 40 between the strut 22 and the frame 2 and, more particularly, between the first end 23 of the strut and the first seat 25.

It may be noted that, in this context, the term "spacer" is intended to be understood to be a shim which is configured to keep the first end 23 of the strut at a suitable spacing from the base of the first seat 25. The spacers 40 are preferably made from metal material, more particularly steel, and have such dimensions as to withstand the forces which are transmitted through the strut 22. In one embodiment, the spacers 40 are in the form of battens with a preferably rectangular cross-section.

Therefore, spacers 40 and the strut 40 constitute an adjustment device 41 for the extent of the section of the outlet 8. By increasing or decreasing the number of spacers 40 which are arranged between the strut 22 and the frame 2, it is possible to change the distance D between the jaws, particularly at the outlet 8. In any case, it is evident that a spacer with a different dimension could also be used as an alternative to a greater number of spacers 40.

Figure 8:
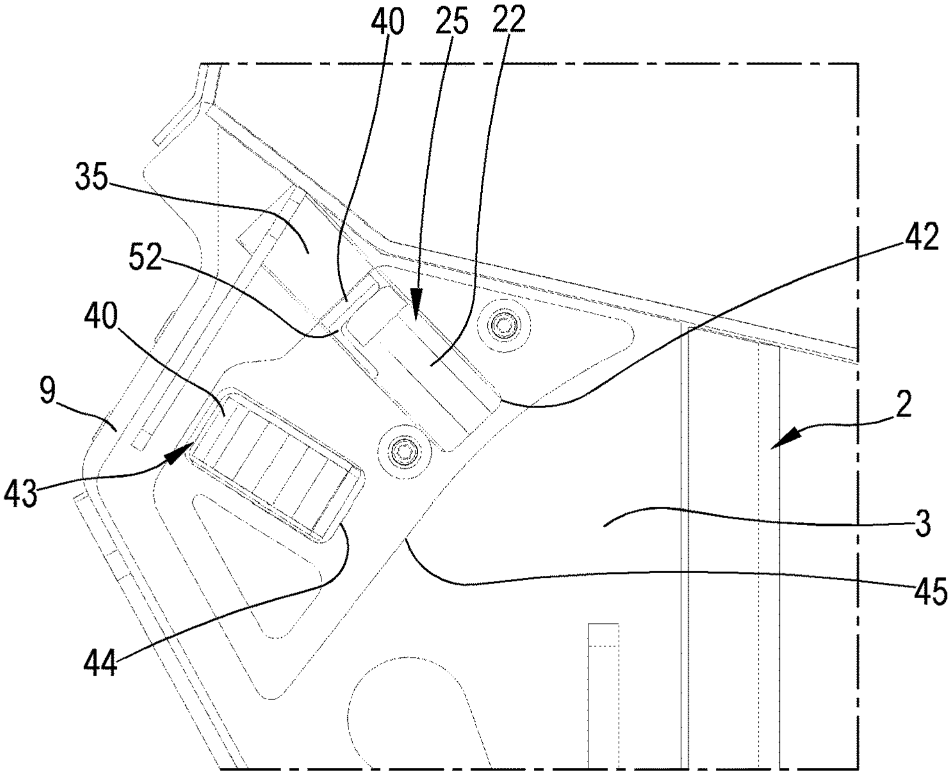
FIG. 8 is a side view of a detail of the bucket of FIG. 1.

With reference to the embodiment of FIG. 8, on a side wall 3 of the frame, preferably at the first seat 25, a first opening 42 is defined in order to insert/remove the spacers 40 to/from the first seat.

When one or more spacers 40 is/are at rest, that is to say, they are not in use in the first seat 25, it is possible to store them in the frame.

To this end, the frame 2 comprises a third seat 43 which is configured to receive spacers 40 at rest. Preferably, the third seat 43 is adjacent to the first seat 25 and/or the rear portion 10*b* of the movable jaw.

In one embodiment, the spacers 40 at rest are or can be removably inserted in the third seat 43 through a second opening 44 which is constructed in a side wall 3 of the frame.

In this manner, the third seat 43 allows a stock of spacers 40 which are always available and readily accessible to be stored directly in the bucket.

For convenience, the first and second openings 42, 44 are preferably constructed in the same side wall 3. More particularly, the first and second openings 42, 44 are located in the same plane and are adjacent to each other so as to allow the operator to readily transfer the spacers 40 between the first opening and the second opening without having to move around the bucket.

In some embodiments, there is provided a removable cover 45 which is configured to close the first and second openings 42, 44 so as to prevent the introduction of dust or the accidental discharge of the spacers.

The cover 45 can be fixed to the side wall 3 of the frame in a removable manner, for example, by means of bolted connection.

Furthermore, the cover 45 can be configured to close the first and the second openings 42, 44 simultaneously, for convenience but also for safety, given that in this manner the risk that one of the two openings may remain open by error, bringing about the accidental discharge of the spacers, is eliminated.

Figure 6:
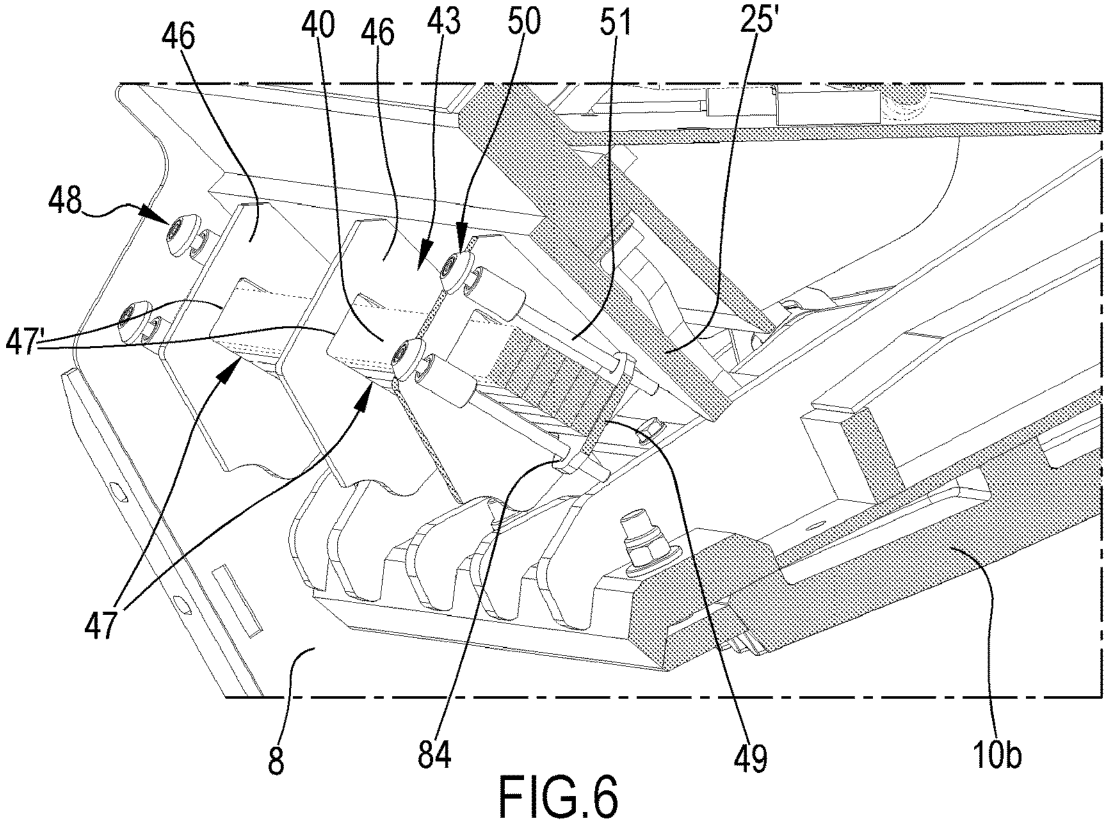

With reference to the embodiments of FIGS. 5 and 6, the third seat 43 for receiving the spacers 40 is also protected by the rear wall 9 of the frame in addition to being protected by any cover 45 present.

The rear wall 9 preferably extends from the bottom cross-member 35 of the first seat towards the outlet 8 and forms an external wall of the frame 2. A plurality of reinforcement plates 46 which contribute to stiffening the frame 2 so as to withstand the loads brought about by the material during the crushing operations can be fixed to the rear wall 9.

It is preferable for each of the reinforcement plates 46 to be connected to the rear wall 9 and to the first containment flank 25' of the first seat of the strut so as to fix the rear wall 9 to the first containment flank 25'.

It is further preferable for the reinforcement plates 46 to be substantially parallel with each other and/or with respect to the side walls 3 of the frame and for them to be substantially perpendicular to the rear wall 9 of the frame and/or the first containment flank 25' of the first seat.

The reinforcement plates 46 may have respective third openings 47 which generally define the third seat 43 for receiving the spacers. To this end, it is preferable for the third openings 47 to be aligned with respect to each other. It is further preferable for the third openings 47 to be aligned with respect to the second opening 44 so as to facilitate the insertion/removal of the spacers in/from the third seat 43 through the second opening.

Naturally, the first opening 42, the second opening 44 and/or the third openings 47 are preferably through-openings. Furthermore, it is preferable for them to have a substantially rectangular shape in order to facilitate the insertion of a pack of spacers 40 which are stacked one above the other.

With reference to the embodiment of FIG. 4, the third openings 47 particularly have a width W and a height H.

The width W of the third openings is preferably greater than the width of the spacers 40 so that the play present laterally to the spacers is sufficient to allow the spacers to slide in the third seat 43.

Still in a preferable manner, each of the third openings 47 extends longitudinally over the height H between an upper end 47' and an opposite lower end 47" of the third openings.

The spacers 40 can be stacked one above the other between the upper end 47' and lower end 47".

In one embodiment, the upper end 47' is directed towards the rear wall 9 of the frame while the lower end 47" is directed at the opposite side, more particularly towards the movable jaw 10.

With reference to the embodiment of FIG. 6, the bucket 1 comprises a blocking device 48 which is able to retain the spacers 40 in abutment against one of the two ends 47', 47" of the third openings (in the present embodiment, against the upper end 47').

The blocking device 48 preferably comprises a movable support 49 which can support the spacers 40 and an urging member 50 which can urge the movable support 49 towards one of the two ends 47', 47" of the third openings.

In the present embodiment, the urging member 50 is configured to urge the movable support 49 towards the upper end 47' of the third openings. Therefore, it is preferable for the spacers 40 to be inserted between the movable support 49 and the upper end 47'.

By acting on the urging member 50, it is possible to adjust the position of the movable support 49 over the height H of the third openings 47 in such a manner as to move the movable support 49 towards or away from the upper end 47' of the third openings in accordance with the total height of the pack of spacers 40 which are inserted between the movable support 49 and the upper end 47'.

The urging member 50 is therefore preferably adjustable and can comprise one or more threaded connection elements 51 (for example, four) which extend between the movable support 49 and the rear wall 9 of the frame over the height H of the third openings 47.

Through-holes 83 may be provided in the rear wall 9 in order to insert the threaded connection elements 51.

With reference to the embodiment of FIG. 6, the threaded connection elements 51 are inserted in a movable manner in the through-holes 83 and become engaged with a screwing action in respective threaded holes 84 which are formed in the movable support 49.

By screwing/unscrewing the threaded connection elements 51, therefore, it is possible to adjust the position of the movable support 49 between the ends 47', 47" of the third openings.

It may be noted that, in the above-described embodiment, the threaded connection elements 51 preferably work as rods between the movable support 49 and the rear wall 9.

Naturally, there is also provision for the possibility that the threaded connection elements 51 can work with compression in order to urge the movable support 49 and/or the spacers 40 in the opposite direction to the rear wall 9 and therefore towards the lower end 47" of the third openings. In this case, it is preferable for the spacers to be inserted between the movable support 49 and the lower end 47".

In any case, it will be appreciated that, when the threaded connection elements 51 are in use, they contribute to stiffening the frame 2. With reference to the embodiment of FIG. 7, the bucket 1 comprises a profile-member 52, more particularly with an L-shaped cross-section, wherein a first side 53 and a second side 54 are identified.

Preferably, the first and second sides 53, 54 are substantially perpendicular to each other. It will be understood that, more generally, an angle between 80° and 100° is formed between the first side and second side 53, 54.

In one embodiment, each of the two sides 53, 54 of the profile-member is substantially flat.

The profile-member 52 can be removably inserted in the first seat 25 through the first opening 42.

The first side 53 is or can be preferably interposed between the bottom cross-member 35 of the first seat and the first end 23 of the strut.

Where applicable, one or more spacers 40 is/are or can be removably inserted between the bottom cross-member 35 of the first seat and the first side 53 of the profile-member.

In a greatly preferred embodiment, the first side 53 is therefore interposed or can be interposed between one or more spacers 40 which are inserted in the first seat 25 and the first end 23 of the strut.

Still in a preferable manner, the profile-member 52 is orientated or configured to be orientated so that the second side 54 is directed towards the first containment flank 25' of the first seat and develops towards the movable jaw 10.

The second side 54 is thereby advantageously configured to laterally retain the first end 23 of the strut during the movement of the movable jaw.

Naturally, there is also provision for the possibility that the first side 53 of the profile-member can be interposed between the base of the first seat 25 and the first end 23 of the strut in the absence of spacers 40 which are inserted in the first seat 25.

In some variants, the first side and second side 53, 54 of the profile-member are substantially identical.

The profile-member 52 is thereby completely reversible. This prevents positioning errors and allows the profile-member 52 to be inverted in the event of local wear at one of the two sides.

In this regard, it may be noted in any case that the profile-member 52 is preferably made from wear-resistant material, more particularly high-strength steel.

The second side 54 of the profile-member 52 is preferably interposed or able to be interposed between the first containment flank 25' of the first seat and the first end 23 of the strut. The first containment flank 25' of the first seat is therefore advantageously configured to at least partially abut the second side 54 of the profile-member.

Figure 11:
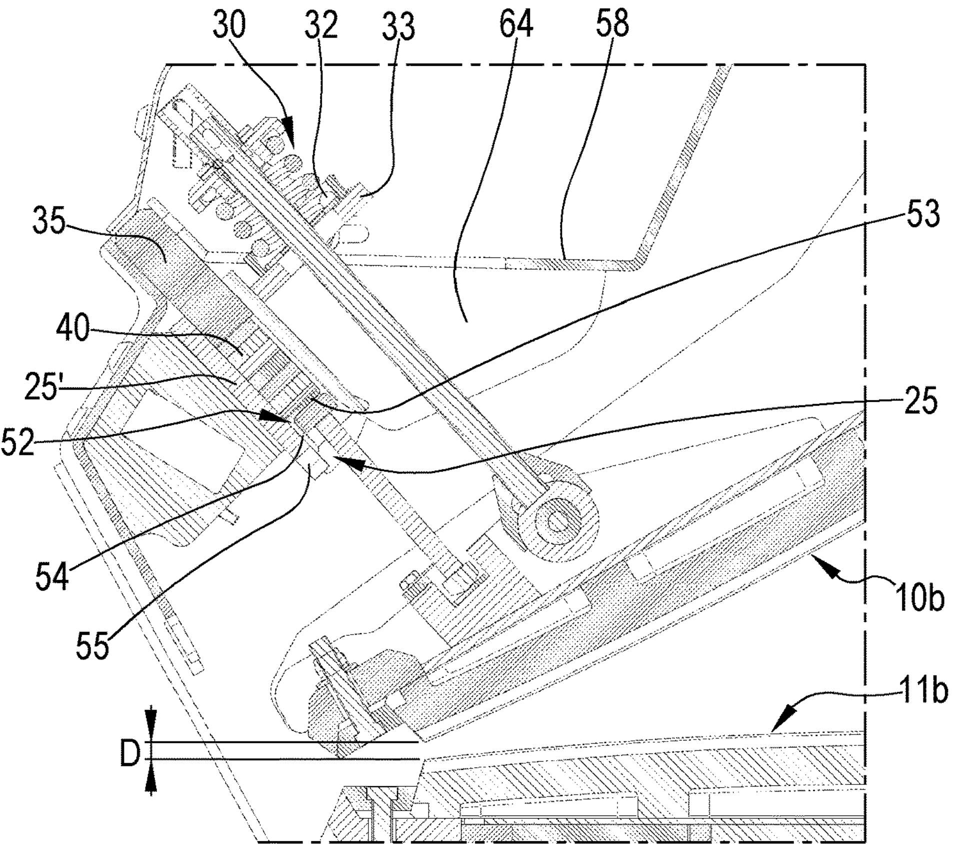
FIG. 11 shows the detail of FIG. 4, in which some components have been arranged in a different operating configuration.
Figure 12:
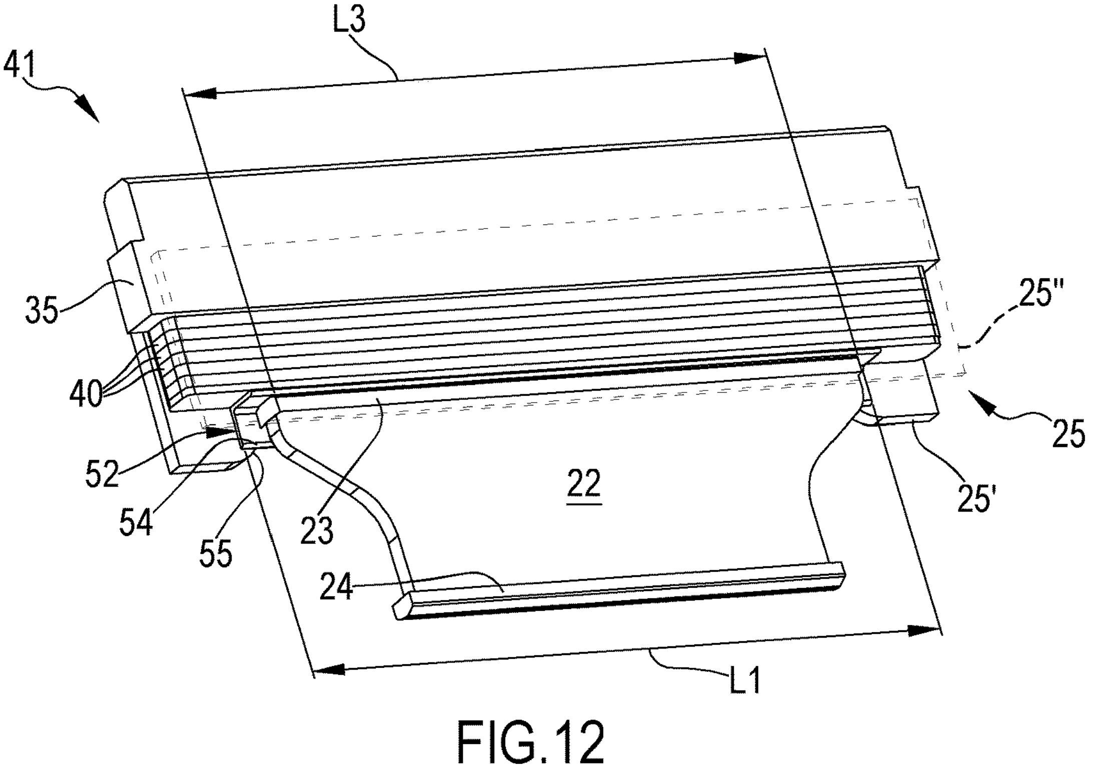
FIGS. 12 and 13 are perspective front and rear views of a detail of FIG. 11, respectively.
Figure 13:
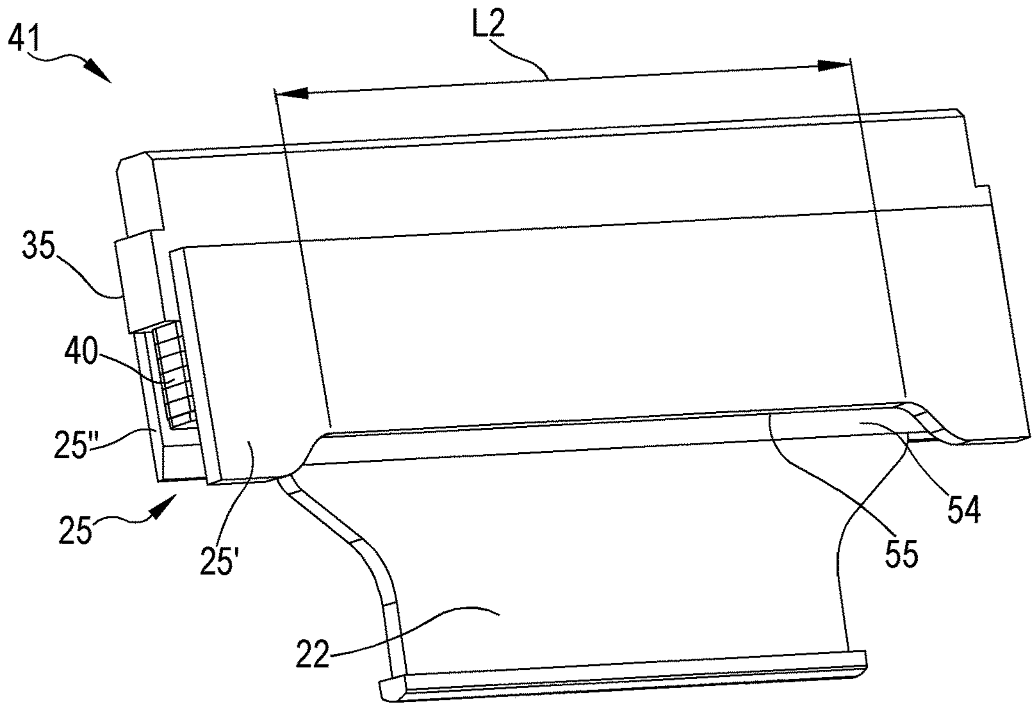

With reference to the embodiments of FIGS. 11 to 13, the second side 54 of the profile-member is configured to project from the first containment flank 25' of the first seat towards the movable jaw 10 so as to retain the first end 23 of the strut during the movement of the movable jaw in accordance with the number of spacers 40 which are inserted between the bottom cross-member 35 of the first seat and the first side 53 of the profile-member.

More particularly, in the absence of any spacers 40 or in the presence of a small number of spacers which are interposed between the bottom cross-member 35 of the first seat and the first side 53 of the profile-member, the second side 54 is completely contained inside the first seat 25. By increasing the number of spacers 40 which are interposed between the bottom cross-member 35 of the first seat and the first side 53 of the profile-member, the profile-member 52 progressively moves away from the bottom cross-member of the first seat until the second side 54 starts to project from the first containment flank 25' of the first seat towards the movable jaw.

In this manner, the profile-member 52 prevents the first end 23 of the strut from leaving the first seat 25 when a high number of spacers are inserted in the first seat, that is to say, when the movable jaw is adjusted so as to carry out the crushing of fine material.

The assembly of the bucket 1 requires that the strut 22 be inserted in the first seat 25, passing through the outlet 8 of the material.

Figure 7:
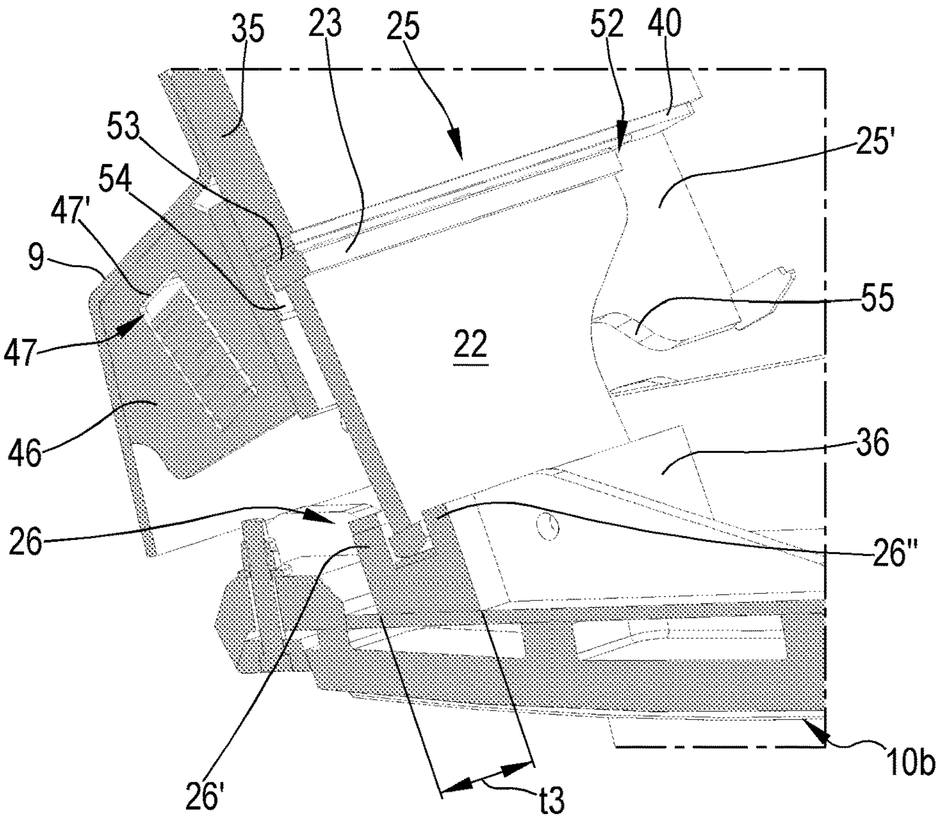

To this end, with reference to the example of FIG. 7, the first containment flank 25' of the first seat at the side directed towards the movable jaw 10 has a recess 55 which is able to allow the insertion of the strut 22 between the containment flanks 25', 25" of the first seat.

The recess 55 further allows a greater oscillation of the strut 22 towards the outlet 8 during the movement of the movable jaw.

With reference to the embodiments of FIGS. 12 and 13, the second side 54 of the profile-member is configured to project from the recess 55 towards the movable jaw in accordance with the number of spacers 40 which are inserted between the bottom cross-member 35 of the first seat and the first side 53 of the profile-member.

The recess 55 is preferably tapered in the direction away from the movable jaw 10 so as to retain at least the longitudinal ends of the profile-member 52 when the second side 54 projects from the recess.

Precisely for allowing the retention action, it is preferable for the profile-member 52 and the recess 55 to develop longitudinally between the side walls 3 of the frame over a first length L1 and a second length L2, respectively, the first length L1 exceeding the second length L2.

It is further preferable for the first end 23 of the strut to develop longitudinally between the side walls 3 of the frame over a third length L3 less than the first length L1 of the profile-member.

As mentioned above with reference to the embodiment of FIG. 3, the bucket 1 comprises a motor 18 which is able to actuate the crushing elements. The motor 18, preferably a hydraulic motor, is at least partially received in a protective casing 56.

In one embodiment, the casing 56 further receives at least partially a hydraulic circuit (not illustrated) for actuating the motor 18.

The casing 56 is at least partially surrounded in the frame 2. In a preferred embodiment, the casing 56 is defined laterally by the side walls 3 of the frame and, still in a preferable manner, it is further delimited by a lower wall 58 of the casing facing the movable jaw 10 and by an upper wall 59 of the casing opposite the lower wall 58.

The lower wall 58 and upper wall 59 of the casing preferably extend between the side walls 3 of the frame, particularly from one of the side walls 3 to the other.

The upper wall 59 of the casing can be connected to the upper wall 4 of the frame, preferably in a removable manner, for example, by bolted connection.

The upper wall 59 of the casing therefore contributes to withstanding the weight of the bucket when the upper wall 4 of the frame is engaged at the free end of the arm of an operating machine.

In order to reinforce the upper wall 59 of the casing in the connection zone with respect to the upper wall 4 of the frame, the upper wall 59 of the casing preferably comprises a reinforcement cross-member 60 which extends between the side walls 3 of the frame.

The casing 56 defines a region R1 which is directed towards the outlet 8 and a region R2 which is arranged in a position opposite the outlet 8 with respect to the flow direction F of the material.

It is preferable for the bucket 1 to comprise a plurality of first reinforcement plates 61 which are arranged inside the casing 56 at the region R2 which is arranged in a position opposite the outlet 8.

Advantageously, the first reinforcement plates 61 are connected to the lower wall 58 and upper wall 59 of the casing so as to fix the lower wall 58 of the casing to the upper wall 59 of the casing.

In this manner, the first reinforcement plates 61 contribute to the absorption and distribution from one wall to the other of the loads brought about by the resistance of the material to be crushed.

Furthermore, when the upper wall 4 of the frame is engaged at the free end of the arm of an operating machine, the first reinforcement plates 61 contribute to withstanding the weight of the bucket.

To this end, it is preferable for the first reinforcement plates 61 to be connected to the upper wall 59 of the casing in a position corresponding to the position of any attachments 6 present.

For example, there may be provided two attachments 6 which are arranged symmetrically with respect to the centre plane of the bucket and two first reinforcement plates 61 which are arranged at the respective attachments.

Figure 10:
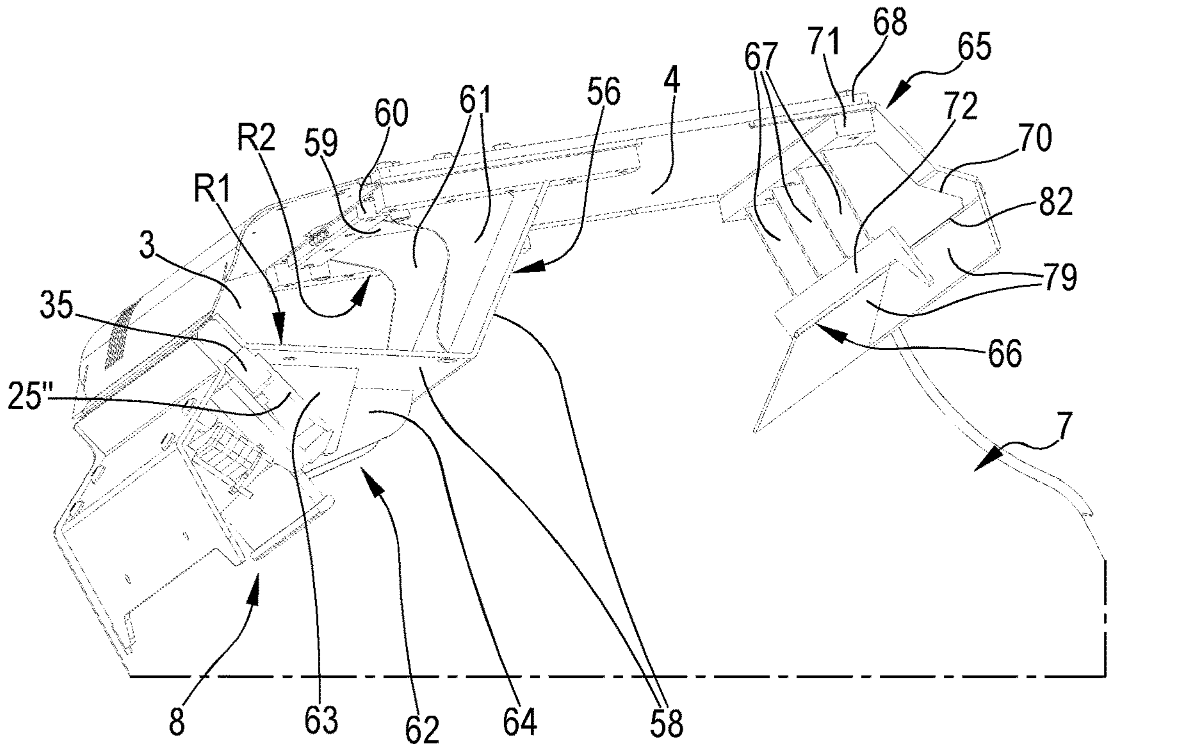

With reference to the embodiment of FIG. 10, the first reinforcement plates 61 are mutually parallel and/or parallel with the side walls 3 of the frame and/or perpendicular to the lower wall 58 and upper wall 59 of the casing.

In order to confer greater rigidity on the upper wall 59 of the casing, it is preferable for the first reinforcement plates 61 to be connected to the reinforcement cross-member 60 so as to fix the reinforcement cross-member 60 to the lower wall 58 of the casing.

Figure 9:
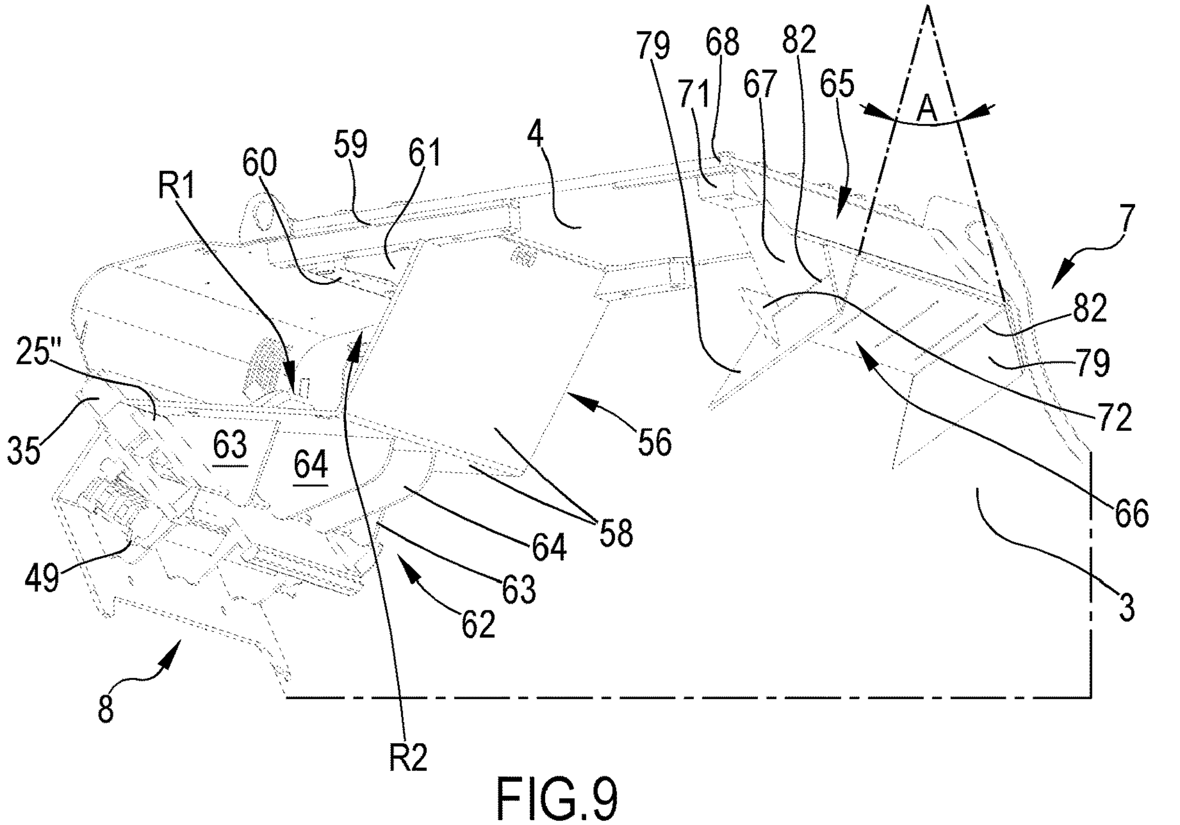
FIGS. 9 and 10 are perspective views of a lateral section of the bucket of FIG. 1, in which some components have been removed in order to illustrate other components thereof which are normally not able to be seen.

In some embodiments, the frame 2 comprises a plurality of second reinforcement plates 62 which are arranged externally with respect to the casing 56 in the region R1 directed towards the outlet 8, as, for example, illustrated in the embodiment of FIG. 9.

The second reinforcement plates 62 are advantageously connected to the lower wall 58 of the casing and the second containment flank 25" of the first seat so as to fix the lower wall 58 of the casing to the second containment flank 25" of the first seat.

The second containment flank 25" of the first seat is in turn preferably fixed to the bottom cross-member 35 of the first seat.

In order to confer greater rigidity on the casing 56 and the frame 2 in general, it is preferable for the second reinforcement plates 62 to be mutually parallel and perpendicular to the lower wall 58 of the casing and/or the second containment flank 25" of the first seat.

In a preferred embodiment, there are provided two first reinforcement plates 61 and, still in a preferable manner, four second reinforcement plates 62. Naturally, a different number of first and/or second reinforcement plates 61, 62 can be provided.

It is preferable for the first reinforcement plates 61 and/or the second reinforcement plates 62 to be arranged symmetrically with respect to the centre plane of the bucket. It is further preferable for the first and second reinforcement plates 61, 62 to be staggered relative to each other.

In some embodiments, the plurality of second reinforcement plates 62 comprise two external plates 63 (with a substantially triangular formation in the present embodiment) and two internal plates 64 which are interposed between the external plates 63. It is preferable for the first reinforcement plates 61 to be located in respective planes between the external plates 63 and the internal plates 64.

With reference to the embodiment of FIG. 11, the internal plates 64 at the opposite side to the movable jaw 10 are fixed to the cross-member 33 to which the second end 32 of the spring is connected. This cross-member 33 preferably extends from one of the external plates 63 to the other so as to confer greater rigidity on the whole.

In order to withstand the loads transmitted by the spring 30, it is preferable for the internal plates 64 to have a greater thickness than the thickness of the external plates 63.

With reference to the embodiment of FIG. 3, the bucket comprises a first plate 65 and a second plate 66 which extend longitudinally between the side walls 3 of the frame.

The first plate 65 is preferably arranged upstream of the movable jaw 10 with respect to the flow direction F of the material and preferably forms an external wall of the frame 2.

Furthermore, in one embodiment, the first plate 65 defines a portion of an edge of the inlet 7.

The second plate 66 preferably develops from the first plate 65 towards the movable jaw 10 so as to accompany the material from the inlet 7 towards the crushing zone 12, therefore contributing to optimizing the crushing of the material.

The first and second plates 65, 66 prevent the material to be crushed from accidentally being able to be introduced between the movable jaw 10 and the upper wall 4 of the frame.

It is preferable for the bucket 1 to further comprise a plurality of third plates 67 (for example, four) which are connected to the first and second plates 65, 66 so as to fix the first plate 65 to the second plate 66.

It will be appreciated that the third plates 67 contribute to the absorption and distribution between the first plate and second plate of the loads brought about by the impacts of the material.

Furthermore, when the upper wall 4 of the frame is engaged with the free end of the arm of an operating machine, the third plates 67 contribute to withstanding the weight of the bucket.

The third plates 67 are preferably arranged downstream of the first plate 65 with respect to the flow direction F.

In order to confer greater rigidity on the first and second plates 65, 66, it is preferable for the third plates 67 to be perpendicular to the first plate and/or second plate and parallel with each other.

An upper edge 68 and a lower edge 69 are defined in the upper wall 4 and in the lower wall 5 of the frame at the side directed towards the inlet 7, respectively.

It is preferable for the first plate 65 to develop from the upper edge 68 towards the lower edge 69.

It is further preferable for the third plates 67 to develop from the first plate and second plate 65, 66 towards the upper wall 4 of the frame.

In some embodiments, a front edge 70 with a tapered formation in the direction away from the movable jaw 10 is identified on each of the third plates 67 at the side directed towards the first and second plates 65, 66. The first and second plates 65, 66 can be fixed to the front edge 70 of the third plates.

With reference to the embodiments of FIGS. 9 and 10, there is provided an upper cross-member 71 which extends along the upper edge 68 between the side walls 3 of the frame, particularly from one of the side walls 3 to the other. Advantageously, the upper wall 4 of the frame is rigidly connected to the upper cross-member 71, preferably in a removable manner, for example, by means of bolted connection.

It will be appreciated that the upper cross-member 71, in conjunction with the possible reinforcement cross-member 60, contributes to withstanding the weight of the bucket when the upper wall 4 of the frame is engaged with the free end of the arm of an operating machine.

It is preferable for the first plate 65, at the side directed towards the upper edge 68, to be rigidly connected to the upper cross-member 71, for example, by means of welding.

In some embodiments, the first plate 65 surmounts the upper cross-member 71 in such a manner as to enclose it inside the frame 2.

Each of the third plates 67 preferably extends from the upper cross-member 71 to the first and second plates 65, 66 so as to fix the upper cross-member to the first and second plates.

In some embodiments, there is provided a lower cross-member 72 which extends between the side walls 3 of the frame (particularly from one of the side walls 3 to the other) and which is preferably rigidly connected to the second plate 66.

In a preferred embodiment, the lower cross-member 72 has a cross-section which develops longitudinally from the second plate 66 towards the upper wall 4 of the frame and in particular in the direction perpendicular to the second plate 66. In this manner, the lower cross-member 72 confers greater rigidity on the second plate.

Each of the third plates 67 advantageously extends from the upper cross-member 71 to the lower cross-member 72 so as to fix the upper cross-member to the lower cross-member. In this manner, the upper and lower cross-members 71 and 72 are fixedly joined to each other during the response to the loads.

In any case, it is preferable for, at least in the centre plane of the bucket, the upper cross-member 71 to have a greater section (for example, in terms of area and/or thickness) with respect to the section of the lower cross-member 72 so as to withstand the weight of the bucket when the upper wall 4 of the frame is engaged with the free end of the arm of an operating machine.

In some embodiments, the first plate 65 extends longitudinally from one of the side walls 3 to the other. In some embodiments, the second plate 66 can also extend longitudinally from one of the side walls 3 to the other. However, it is preferable for the second plate 66 to be connected to the side walls 3 by means of respective connection plates 79.

More particularly, it is preferable for the second plate 66 to have two opposite longitudinal ends 82 which are directed towards respective opposite side walls 3 of the frame and for two respective connection plates 79 to develop from the opposite longitudinal ends 82 of the second plate to the side walls 3 of the frame so as to fix the opposite longitudinal ends 82 to the side walls 3. It is further preferable for the connection plates 79 to have respective location planes which diverge in a direction away from the first and second plates 65, 66. In fact, this geometry contributes to stiffening the frame 2 counter to the loads brought about by the impacts and the crushing of hard material.

The connection plates 79 further contribute to optimizing the flow of the material from the inlet 7 towards the crushing zone 12, preventing material residues, for example, bituminous material residues, from being able to remain at the intersection between the second plate 66 and the side walls 3. To this end, it is known that preferably the connection plates 79 develop longitudinally from the inlet 7 towards the movable jaw 10 so as to accompany the material in the flow direction F.

With reference to the embodiment of FIG. 9, an angle A between 20° and 120° is formed between the location planes of the connection plates 79. More particularly, the angle A is between 40° and 100° and preferably between 50° and 90°. In this manner, the location of the connection plates 79 is such that, when the upper wall 4 of the frame is engaged at the free end of the arm of an operating machine, the connection plates 79 also contribute to withstanding the weight of the bucket.

In the present embodiment, in order to ensure greater rigidity the connection plates 79 are further fixed to the respective opposite longitudinal ends of the lower cross-member 72.

Figure 14:
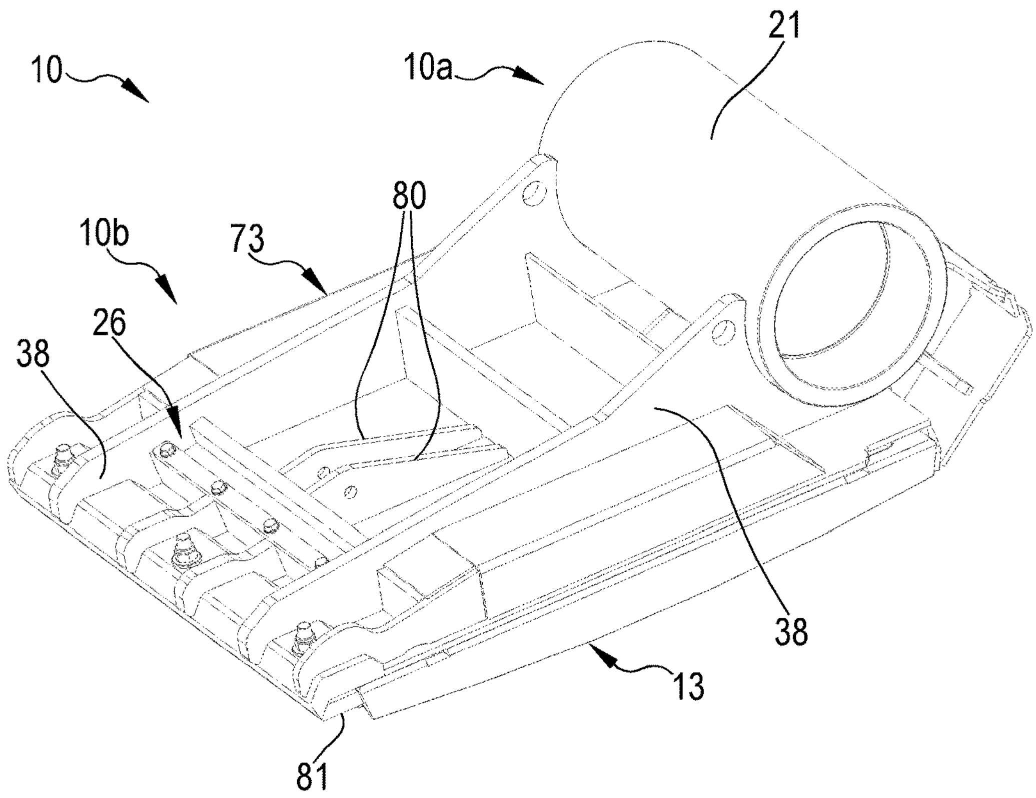
FIG. 14 is a perspective view of a jaw of the bucket of FIG. 3.
Figure 15:
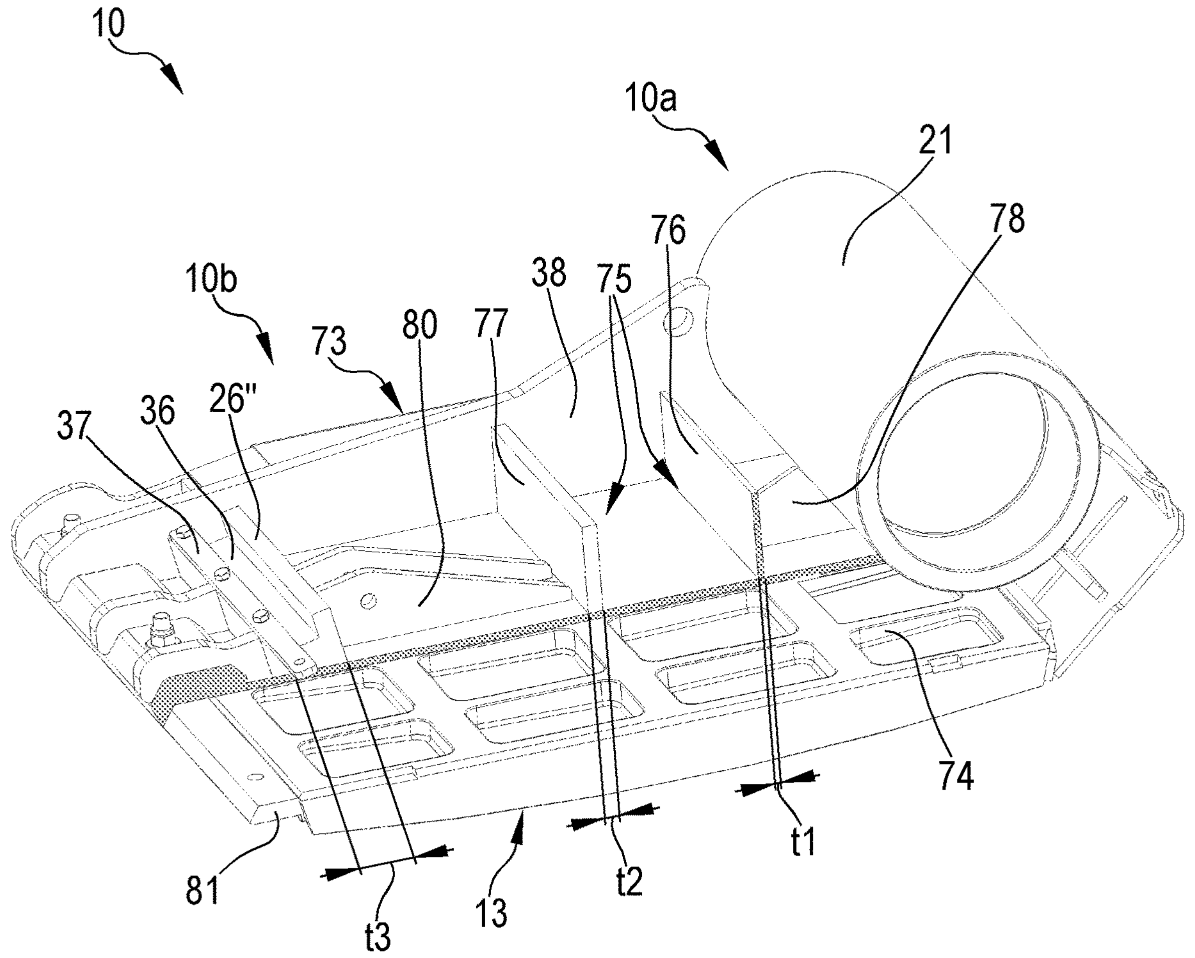
FIG. 15 is a perspective, partially sectioned view of the jaw of FIG. 14.

With reference to the embodiments of FIGS. 14 and 15, in some embodiments the movable jaw 10 comprises a framework 73 which includes a pair of longitudinal members 38 which extend in the flow direction F of the material, with a preferably symmetrical arrangement with respect to the centre plane of the bucket 1.

The framework 73 of the movable jaw may further comprise a plurality of respective cross-members 75 which are mutually parallel and which extend from one of the longitudinal members 38 to the other.

It is preferable for the plurality of cross-members 75 of the movable jaw to comprise a first cross-member 76 and a second cross-member 77 which is arranged downstream of the first cross-member with respect to the flow direction F of the material.

It is further preferable for the second cross-member 77 to have a greater section (for example, in terms of area and/or thickness t2) than the section of the first cross-member 76. In a preferred embodiment, the section of the second cross-member 77 has a thickness t2 which is at least double the thickness t1 of the section of the first cross-member 76.

It may be noted that, in this context, the term "section" is intended to be understood to mean preferably a cross-section which in the case of the first and/or second cross-member 76, 77 may be, for example, a rectangular section. The thicknesses t1, t2 of the respective sections are preferably measured in the flow direction F and/or in the longitudinal development of the movable jaw 10 from the inlet 7 towards the outlet 8.

It will be appreciated that this structure confers on the framework 73 of the movable jaw an increasing rigidity in the flow direction F, therefore increasing the resistance of the movable jaw both at the crushing zone 12 which is interposed between the jaws and at the second connection 17 which involves the rear portion 10*b* of the movable jaw.

As mentioned above, the movable jaw 10 may comprise a metal tube 21, in which the central portion 20 of the shaft is received.

In a preferred embodiment, the metal tube 21 is fixed to the longitudinal members 38 and arranged upstream of the first cross-member 76 with respect to the flow direction F.

The movable jaw 10 may further comprise a first reinforcement plate 78 which is connected to the metal tube 21 and the first cross-member 76 so as to fix the metal tube to the first cross-member. In one embodiment, the first reinforcement plate 78 extends in the centre plane of the bucket 1.

In some embodiments, the plurality of cross-members 75 of the movable jaw also comprises a third cross-member 36 which is arranged downstream of the second cross-member 77 with respect to the flow direction F.

The third cross-member 36 has a preferably greater section (for example, in terms of area and/or thickness t3) than the section of the second cross-member 77. In a preferred embodiment, the section of the third cross-member 36 has a thickness t3 which is at least double the thickness t2 of the section of the second cross-member 77. It may be noted that the thicknesses t2, t3 of the respective sections are preferably measured in the flow direction F and/or in the longitudinal development of the movable jaw 10 from the inlet 7 towards the outlet 8.

In some embodiments, in order to ensure that the second seat 26 is directed towards the first seat 25, the third cross-member 36 and more particularly the respective containment flanks 26', 26" are located in an inclined plane with respect to the location planes of the first cross-member 76 and/or the second cross-member 77. In this case and in general, the thickness t3 can be measured transversely relative to the location plane of the third cross-member 36 and/or the respective containment flanks 26', 26", as shown in the embodiment of FIG. 7.

In this manner, first, second and third cross-members 76, 77, 36 confer on the movable jaw 10 a rigidity which progressively increases in the flow direction F and in particular towards the rear portion 10*b* where the movable jaw is more subject to the loads transmitted by the strut 22.

Precisely in order to counteract the loads transmitted by the strut, it is preferable for the second seat 26 of the strut to be formed on the third cross-member 36. In a preferred embodiment, the third cross-member 36 therefore comprises the containment flanks 26', 26" of the second seat and it advantageously has such dimensions as to withstand the forces which are transmitted through the strut. It is further advantageous for the containment flanks 26', 26" to be made from a single piece so that the third cross-member 36 is structurally monolithic.

In some embodiments, the movable jaw 10 comprises a pair of second reinforcement plates 80 which extend in the flow direction F from the second cross-member 77 to the second containment flank 26" of the second seat so as to fix the second cross-member to the second containment flank of the second seat.

The second reinforcement plates 80 are preferably interposed between the longitudinal members 38 and still in a preferable manner have a symmetrical arrangement with respect to the centre plane of the bucket 1.

The second reinforcement plates 80 contribute to the absorption and distribution, from the second cross-member to the third one, and vice versa, of the loads brought about by the strut 22 and the resistance of the material to be crushed.

In one embodiment, the second reinforcement plates 80 further allow the movable jaw 10 to be connected to the rod 27. The second end 29 of the rod can in fact be interposed between the second reinforcement plates 80 and connected thereto by means of hinging. In order to allow the hinging thereof, it is preferable for the second reinforcement plates 80 to be bored.

As mentioned above, the movable jaw 10 may comprise a grooved plate 13 which is able to facilitate the crushing action.

The grooved plate 13 can be removably fixed to the framework 73 of the movable jaw by means of a locking batten 81. The locking batten 81 can be bolted to the framework 73 downstream of the plurality of cross-members 75 of the movable jaw with respect to the flow direction F so as to increase the rigidity of the movable jaw at the outlet 8.

In one embodiment, the grooved plate 13 has a plurality of reinforcement ribs 74 which are directed towards the framework 73 of the movable jaw. The ribs 74 can extend parallel and/or transversely to the flow direction F of the material.

The invention thereby achieves the objects set out, further affording a number of advantages with respect to the prior art being referred to, including the capacity for adjusting the dimensions of the crushed gravel and a substantial increase in the production capacity of the bucket.

Furthermore, as a result of the structural characteristics thereof, the bucket is particularly resistant to the loads brought about by the material during the crushing operations.

Another important advantage which is achieved is the fact that the power consumed by the bucket according to the invention is less than the power consumed by the conventional buckets as a result of the greater rigidity of the frame and the crushing elements, further involving a reduction in the processing time and a reduction of the noise emissions.

The invention claimed is:

1. A crusher bucket comprising:
a frame,
crushing elements comprising a movable jaw and a fixed jaw which are received in the frame, and
an adjustment device which can change a distance between the jaws at an outlet of the material, the adjustment device comprising:
a strut having a first end and a second end which are opposite each other and which are received in a first seat which is defined on the frame and in a second seat which is defined on the movable jaw, respectively, and
one or more spacers which are or can be removably inserted between the first seat and the first end of the strut through a first opening which is constructed on a side wall of the frame,
wherein the frame comprises a third seat which is configured to receive the spacers at rest, the spacers at rest being removably inserted or insertable in the third seat through a second opening which is constructed on the side wall.

2. The crusher bucket according to claim 1, comprising a removable cover which is configured to at least partially close the first opening and the second opening.

3. The crusher bucket according to claim 1, wherein the frame comprises two opposite side walls, a rear wall which connects the side walls to each other adjacent to the outlet and a plurality of reinforcement plates which are fixed to the rear wall, the reinforcement plates having respective third openings which are aligned relative to each other and aligned with respect to the second opening, the set of the third openings defining the third seat.

4. The crusher bucket according to claim 3, wherein the reinforcement plates are substantially mutually parallel and/or substantially parallel with the side walls.

5. The crusher bucket according to claim 3, wherein the first seat at the side directed towards the outlet is defined laterally by a first containment flank, each of the reinforcement plates being connected to the rear wall and to the first containment flank of the first seat so as to fix the rear wall to the first containment flank of the first seat.

6. The crusher bucket according to claim 3, wherein the reinforcement plates are substantially perpendicular to the rear wall and/or to the first containment flank of the first seat.

7. The crusher bucket according to claim 3, wherein each third opening extends longitudinally between two opposite ends, the spacers being stacked or being able to be stacked one above the other between the opposite ends.

8. The crusher bucket according to claim 7, comprising a blocking device which is able to retain the spacers in abutment against one of the two opposite ends.

9. The crusher bucket according to claim 8, wherein the blocking device comprises a movable support which can support the spacers and an urging member which can urge the movable support towards one of the two opposite ends.

10. The crusher bucket according to claim 9, wherein the urging member comprises threaded connection elements which extend between the movable support and the rear wall along the longitudinal development of the third openings.

* * * * *